E. L. SCHMITZ.
PENCIL.
APPLICATION FILED FEB. 4, 1908.
903,509.  Patented Nov. 10, 1908.
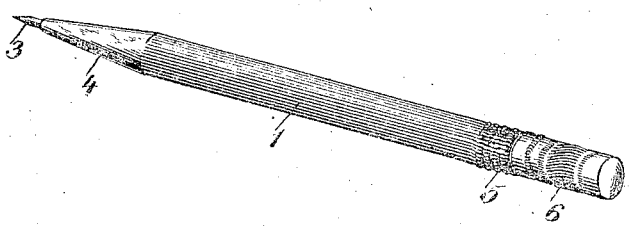
*Fig. 1,*
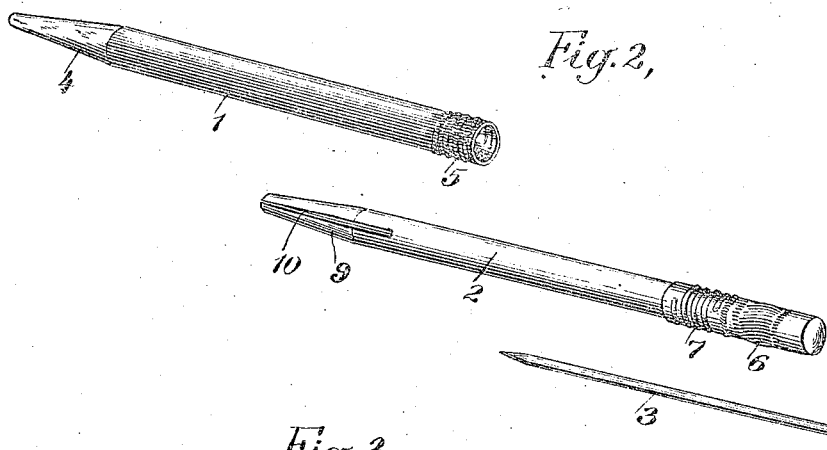
*Fig. 2,*
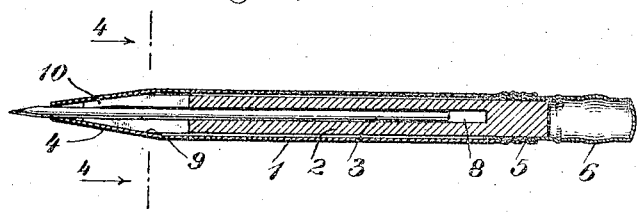
*Fig. 3,*
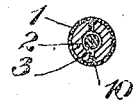
*Fig. 4,*
WITNESSES:
INVENTOR
Egon L. Schmitz
BY
ATTORNEY

UNITED STATES PATENT OFFICE.

EGON L. SCHMITZ, OF NEW YORK, N. Y., ASSIGNOR TO EBERHARD FABER PENCIL COMPANY, OF BROOKLYN, NEW YORK, A CORPORATION OF NEW YORK.

PENCIL.

No. 903,509.  Specification of Letters Patent.  Patented Nov. 10, 1908.

Application filed February 4, 1908. Serial No. 414,154.

*To all whom it may concern:*

Be it known that I, EGON L. SCHMITZ, a citizen of the United States, residing in the city, county, and State of New York, have invented a certain new and useful Improvement in Pencils, of which the following is a specification.

This invention relates to pencils and has reference, more particularly, to pencils of the type having a stick of lead movable within a holder and clamping devices for gripping the lead stick and holding it with one end projecting beyond the end of the holder the desired amount.

The object of my invention is to effect certain improvements in the construction of pencils of this type whereby a pencil is provided which is more convenient to use, in which the lead stick is held firmly and the danger of breaking it reduced to a minimum, which is of attractive appearance and which may be manufactured at small cost.

The preferred embodiment of my invention is illustrated in the accompanying drawings in which Figure 1 is a perspective view of the pencil, Fig. 2 is a perspective view of the three parts thereof, and Figs. 3 and 4 are longitudinal and transverse sections, respectively, the section of the latter being on line 4—4 of Fig. 3.

Referring to these drawings, the pencil consists of a tubular casing 1, within which is a lead-holding member 2 having a bore to receive the lead stick and clamping devices for gripping the stick to hold it in the proper position, and the stick of lead 3, the end of which projects beyond the end of the member 2 and casing 1. The casing 1 is a tube of thin metal; it is of uniform cross-section throughout the major portion of its length and at one end is contracted to form the tapered portion 4. At the other end, casing 1 is provided with means for securing it and the lead-holder which fits within it together, as, for instance, the screw-thread shown at 5. The body-portion of the casing 1 is preferably finished to form a good gripping surface thereon, as by providing a multiplicity of shallow corrugations therein; the tapered portion 4 need not, however, be so corrugated.

The holder 2 is preferably made of wood and is of a size to slide readily within the casing 1. At its outer end it is formed to coact with the securing means on the casing; this is preferably done by providing on the end of the wooden holder a metallic cap 6 which may be embellished as desired and in which threads 7 are formed to coact with the threads 5. The holder 2 is provided with an axial bore 8 to receive the stick of lead 3, this bore extending through a large part or all of the holder. The end of the holder opposite to that on which the cap 6 is secured is tapered as shown at 9 to correspond with the taper of the portion 4 of the casing 1, and this end of the holder is slotted longitudinally as shown at 10, so that the parts on either side of the slot form clamp-jaws.

The parts thus constructed are assembled by placing the lead 3 in the bore in holder 2 and then inserting the holder into the casing 3 until the relative movement of these parts is arrested by the engagement of the threads 5 and 7. Then, by holding the parts in an inclined position, the lead is allowed to move in the bore of holder 2 until the end of the lead projects beyond the end of the casing 1 the desired amount. With the lead in this position, the holder and casing are turned relatively and the coaction of threads 5 and 7 causes the holder to move axially within the casing until the walls of the tapered portion 9 on the holder engage the interior walls of the tapered portion 4 on the casing and the two clamp-jaws on the holder are moved toward each other until they grip the stick of lead between them. When the end of the lead becomes worn or broken off, the casing and holder may be turned relatively in the reverse direction to loosen the grip of the clamp-jaws on the lead, whereupon the latter may be moved to a new position in which it may be again clamped.

The pencil constructed as above described is quite convenient to use since the body portion thereof is of uniform cross-section and of comparatively large diameter at the point where it is grasped in the fingers. Also, there is little danger of the stick of lead being broken in clamping it and holding it in position as the clamp-jaws are of wood and of such length that the clamping action takes place over a substantial portion of the length of the lead stick. It will be seen that moving the lead to different positions and locking it in those positions may be quickly and readily accomplished. The pencil may be given a very attractive appearance as all the exterior parts are of metal and may be decorated as desired; in the preferred embodiment, the tapered portion 4 is given a polished surface in imitation of the cutaway portion of an ordinary wooden lead-pencil. The simplicity of the construction of the pencil and the small number of parts from which it is made are apparent and the manufacturing cost is, therefore, quite small.

Having now described my invention, what I claim as new therein and desire to secure by Letters Patent is as follows:—

A pencil comprising a tubular metallic casing having a tapered portion at one end and a screw-thread formed therein at the other, a wooden lead-holder corresponding in size to the interior of said casing and slotted at one end to form clamp-jaws of substantial length at the sides of said slot, said lead-holder lying within said casing with the clamp-jaws at one end engaging the interior surface of said tapered portion and the other end extending beyond said threaded end of the casing, a metallic cap on said last-named end of the holder having a screw-thread formed therein coacting with said thread on the casing, and a stick of lead, said holder having an axial bore therein corresponding in size to said stick of lead and in which the latter is received, substantially as set forth.

This specification signed and witnessed this 1st day of February, 1908.

EGON L. SCHMITZ.

Witnesses:
 ELMER H. OLMSTEAD,
 CHARLES AKEN